United States Patent [19]
Cooper

[11] Patent Number: 6,062,801
[45] Date of Patent: May 16, 2000

[54] MULTICOMBINATION VEHICLE AND METHOD FOR TRANSPORTING A PAYLOAD IN AN UNDERGROUND MINE

[75] Inventor: James W. Cooper, Darwin, Australia

[73] Assignee: Gulf Transport Co. PTY. Ltd., Northern Territory, Australia

[21] Appl. No.: 08/942,942

[22] Filed: Aug. 4, 1997

[51] Int. Cl.$^7$ ...................................................... B60D 1/14
[52] U.S. Cl. .......................... 414/470; 414/397; 180/14.2; 180/14.1; 298/23 MD; 298/8 T; 298/18; 280/478.1
[58] Field of Search .......................... 298/18, 87, 23 MD, 298/8 R; 414/397, 470; 180/14.1, 14.2, 24.01, 14.3, 235, 14.4; 280/418.1; 105/161, 364

[56] References Cited

U.S. PATENT DOCUMENTS

| | | | |
|---|---|---|---|
| 1,855,238 | 4/1932 | Higbee et al. | 180/14.1 X |
| 1,972,352 | 9/1934 | Muller | 105/161 |
| 2,161,818 | 6/1939 | Joy | 105/161 |
| 2,331,484 | 10/1943 | Lee | 105/161 |
| 2,897,004 | 7/1959 | Skeens | 298/25 |
| 3,010,727 | 11/1961 | Swenson et al. | 275/7 |
| 3,209,850 | 10/1965 | Fish | 180/14.2 |
| 3,240,164 | 3/1966 | Flowers | 105/276 |
| 3,323,838 | 6/1967 | Trucco et al. | 298/8 |
| 3,403,939 | 10/1968 | Stark et al. | 298/23 MD |
| 3,424,498 | 1/1969 | Maxon, jr. | 298/7 |
| 3,821,934 | 7/1974 | Maeda | 104/147 |
| 3,841,236 | 10/1974 | Hammonds et al. | 105/364 |
| 3,884,526 | 5/1975 | Sweet et al. | 298/1 |
| 3,890,005 | 6/1975 | Sien | 298/22 |
| 4,078,822 | 3/1978 | Shelquist et al. | 298/8 T X |
| 4,087,129 | 5/1978 | Maxey | 298/18 |
| 4,185,710 | 1/1980 | Kronogard | 180/14 |
| 4,382,607 | 5/1983 | Voight | 180/14.1 X |
| 4,619,484 | 10/1986 | Maxey | 298/18 |
| 4,805,702 | 2/1989 | White | 169/64 |
| 4,890,684 | 1/1990 | Simmons | 180/135 |
| 5,265,940 | 11/1993 | Ostermeyer | 298/1 B |
| 5,588,711 | 12/1996 | Hall | 298/18 |

FOREIGN PATENT DOCUMENTS

| | | | |
|---|---|---|---|
| 306816 | 3/1989 | European Pat. Off. . | |
| 337235 | 4/1920 | Germany | 298/8 T |
| 3730101 | 3/1989 | Germany . | |
| 131950 | 5/1993 | Japan | 180/14.2 |
| 21914 | 12/1911 | Norway | 180/14.2 |
| 1556988 | 4/1990 | U.S.S.R. . | |
| 20823 | of 1901 | United Kingdom | 180/14.1 |
| 887549 | 1/1962 | United Kingdom | 180/14.1 |

*Primary Examiner*—Frank E. Werner
*Attorney, Agent, or Firm*—Garrison Morris & Haight, PLLC

[57] ABSTRACT

A multicombination vehicle and method are provided for transporting a payload, such as a mined metal ore, over the roadways existing in an underground mine. The multicombination vehicle includes a powered towing unit, which may comprise a rigid body truck, and at least one towed unit mechanically coupled to the rigid body truck. The vehicle may also include a plurality of the towed units, with a forward most one of the units coupled to the rigid body truck and each adjacent pair of the towed units being coupled to one another. Each of the units includes a chassis, a plurality of wheeled axles connected to the chassis for supporting the respective unit as the vehicle travels over the roadways of the mine, and a draw frame attached to and extending rearwardly from the corresponding chassis, with a coupling attached to a rear end of the draw frame. Each towed unit may comprise a semi-trailer mounted on a dolly, with a drawbar attached to and extending forwardly from the dolly and connected with the coupling of the immediately forward unit of the vehicle. The multicombination vehicle is configured so as to minimize the swept path width of the vehicle as the vehicle negotiates turns. This is accomplished by providing each of the towed units with a dolly drawbar length having a value of less than 3.0 meters and establishing a ratio of the coupling overhang-to-wheelbase, for each of the units, of at least 0.5.

18 Claims, 7 Drawing Sheets

MULTICOMBINATION VEHICLE AND METHOD FOR TRANSPORTING A PAYLOAD IN AN UNDERGROUND MINE

BACKGROUND 1.0 Field of the Invention

The present invention is directed to vehicles for transporting a payload and, more particularly, to a multicombination vehicle for transporting a payload, such as a mined ore, over the roadways in an underground mine. The multicombination vehicle includes at least one powered, load-carrying towing unit and at least one load-carrying towed unit. The multicombination vehicle is configured to minimize the swept path width of the vehicle to permit operation within the relatively narrow tunnels and included relatively low radius turns typically found in underground mines.

2.0 Related Art

Mined payloads, such as various metal ores, are typically transported through the tunnels of an underground mine by either a railway train including a locomotive and one or more cars operating on a fixed system of railway tracks, or rigid body, load-carrying trucks. Although each known system may be advantageously utilized in certain applications, they are both subject to various disadvantages.

An underground railway system is relatively expensive to install and operate due to the cost of acquiring the locomotive and installing the fixed railway system and the associated maintenance costs. Furthermore, and perhaps more importantly, an underground railway system is route-specific and therefore not flexible to changes in route without incurring the expense of installing additional railway tracks. Underground mines typically have several mining areas, which may occur on multiple levels within the mine. The mined product, such as ore, is typically transported from each mining area to a common receiving area, and then through one or more vertical chutes connecting different levels of the mine if required, to a central processing area where the ore is processed, or sufficiently crushed. The ore is then typically removed from the mine through a single vertical shaft extending to the surface. A single ore crusher and associated shaft is typically used due to the prohibitive costs associated with drilling a shaft from the surface to the mining area deep below the ground. As each new mining area opens, it is necessary to incur the cost of installing new track for the railway system, or to use supplemental vehicles to haul the ore from the mining area to the end of the railway track system.

Rigid body load-carrying trucks, such as wheeled dump trucks, are not route-specific since they are capable of traveling over various roadways within the mine between various origination and destination points. However, known trucks of this type are typically designed for hauling loads over relatively short distances and rough terrain, such as that which may be experienced in above-ground applications. Accordingly, such trucks are typically designed with relatively large tires for relatively slow speed operation and are relatively expensive to operate and maintain due to fuel and tire costs. The efficiency of these vehicles typically decreases as the hauling distance increases. Furthermore, a single rigid body truck of this type has a significantly lower payload capacity as compared to the multicombination vehicle of the present invention.

Multicombination vehicles commonly referred to as "road trains" have been in use for some time, particularly in Australia, for the purpose of hauling mined products, or the commodities of other industries, over above-ground roadways. Known "road trains" typically include a powered load-carrying towing vehicle such as a wheeled, rigid body truck and one or more load-carrying towed vehicles. The towed vehicles may include a wheeled dolly and a semi-trailer coupled to the dolly. Both the towing and towed vehicles may include load-carrying bodies of the side-tipping type. However, conventional "road trains" are typically designed for use at relatively high speed, for instance at speeds up to 55–60 mph, and are therefore not capable of operating in an underground mine for the following reasons. Due to the relatively high speed, straight-down-the-road application of known above ground road trains, the mechanical coupling between each adjacent pair of vehicles is located as far forward as possible, or as close to the rear suspension of the upstream or forward vehicle, within the physical constraints imposed in a turning situation by the tow bar connecting the vehicles (i.e., to avoid contact between the tow bar and the chassis of the forward vehicle when turning). This location of mechanical couplings between each adjacent pair of vehicles is required to maintain the side-to-side sway, or yaw, of the last vehicle within acceptable limits for aboveground, over-the-road application, but is not compatible for operation within an underground mine due to the relatively low operating speeds as well as the relatively narrow tunnels and small radius bends experienced in underground mines. The inventor is unaware of any known above ground, road-legal multicombination vehicle of the type just described, which is capable of gaining access to an underground mine and operating within the profiles of the mine as typically exists in underground mines throughout the world.

In view of the foregoing disadvantages and limitations associated with known load-carrying vehicles, a commercial need exists for an improved load-carrying vehicle for use in underground mines.

SUMMARY

Accordingly, the present invention provides a multicombination vehicle and method for transporting a payload, such as a mined metal ore, over the roadways existing in an underground mine. The multicombination vehicle has a significantly reduced swept path width as compared to conventional aboveground road trains which permits the multicombination vehicle of the present invention to gain access to and operate within the tunnels typically found in underground mines, such as those used to mine a metal ore. The multicombination vehicle of the present invention is not route-specific and therefore, is much more flexible than the use of an underground railway system to transport a payload within the underground mine. Furthermore, the use of the multicombination vehicle of the present invention has significantly higher payload-to-tare weight and payload-to-horsepower ratios than conventional dump trucks typically used to haul ore within an underground mine. This may result in a significant cost savings to the operator of the mine.

According to one embodiment of the present invention, the multicombination vehicle comprises a powered towing unit having a chassis, a forward, wheeled axle suspended from the chassis and a rear, wheeled axle assembly suspended from the chassis by a rear suspension system. The forward, wheeled axle and rear, wheeled axle assembly support the powered towing unit for movement over the roadway. The powered towing unit further includes a source of motive power, which may comprise a diesel engine or an electric motor, for instance, and means for transmitting torque from the source of motive power to the driving axle.

The multicombination vehicle further includes a towed unit mechanically coupled to the powered towing unit. The towed unit includes a chassis and a load-carrying body mounted on and disposed above the chassis. The towed unit further includes at least one wheeled, driven axle supporting the towed unit for movement over the roadways. The towed unit may include a forward, wheeled, tandem axle assembly suspended from the chassis by a first suspension system and a rear, wheeled, tandem axle assembly suspended from the chassis by a second suspension system. The towed unit has a wheelbase which is defined as the longitudinal distance between the longitudinal centers of the first and second suspension systems. The towed unit further includes a drawbar attached to and extending from the chassis of the towed unit.

The powered towing unit further includes a draw frame attached to and extending rearwardly from the chassis of the towing unit and a coupling attached to a rear end of the draw frame and connected with the drawbar of the towed unit. The powered towing unit has a wheelbase extending between the longitudinal centers of suspension of the forward axle and rear axle assembly. The powered towing unit further includes a coupling overhang defined as the longitudinal distance between a substantially vertical axis of rotation passing through the coupling and the longitudinal center of suspension of the rear axle assembly. The powered towing unit further includes a ratio of the coupling overhang to the wheelbase having a value of at least 0.5.

The towed unit preferably comprises a converter dolly and a semi-trailer having a forward end mounted on the converter dolly. Both the dolly and semi-trailer include a wheeled, tandem axle assembly. Each of the tandem axle assemblies includes a pair of wheeled, driven axles. The converter dolly further includes a chassis, a ball-race turntable mounted on an upper surface of the chassis and the drawbar of the towed unit, which may comprise an A-frame drawbar. The towed unit further comprises a dolly drawbar length defined as the longitudinal distance between a substantially vertical axis of rotation passing through the coupling which interconnects the powered towing unit and the towed unit, and the longitudinal center of a suspension system used to suspend the tandem axle assembly of the dolly. In a preferred embodiment, the dolly drawbar length has a value less than 3.0 m.

The powered towing unit further includes a load-carrying body mounted on and disposed above the chassis of the towing unit. The load-carrying bodies of the towing and towed units preferably comprise side-tipping, load-carrying bodies which may be actuated to a tipped position by a pair of actuators disposed proximate each of the opposing end portions of the corresponding load-carrying body.

In another preferred embodiment, the multicombination vehicle includes a plurality of the towed units, wherein a forward most one of the towed units is mechanically coupled to the powered towing unit and each adjacent pair of the towed units are mechanically coupled to one another. In this embodiment, each of the towed units has a dolly drawbar length having a value less than 3.0 meters and a coupling overhang-to-wheelbase ratio of at least 0.50. Furthermore, the load-carrying body of each of the towed units is a side-tipping, load-carrying body.

According to a second aspect of the present invention, a method is provided for transporting a mined payload over the roadways existing in an underground mine. According to a preferred embodiment, the method comprises the steps of providing a multicombination vehicle having a powered towing unit and at least one towed unit, with each adjacent pair of units being mechanically coupled to one another, and each of the units including a load-carrying body. The method further includes the steps of minimizing a swept path width of the multicombination vehicle as the vehicle travels over the roadways of the underground mine, loading pre-determined quantities of the payload into the load-carrying bodies of each of the units of the vehicle, driving the vehicle over at least one of the roadways to a payload-dumping area, and dumping the payload from the load-carrying bodies of each of the units into a receptacle disposed in the payload-dumping area.

The step of minimizing the swept path width may include the steps of establishing a ratio of the coupling overhang to the wheelbase of at least 0.5, for each unit of the vehicle, and configuring each of the towed units so that the dolly drawbar length of each of the towed units has a value less than 3.0 meters.

According to other embodiments, the loading step may further comprise the steps of driving the multicombination vehicle over at least one of the roadways to a payload-receiving area on a first one of the mine levels, positioning the load-carrying body of one of the units of the vehicle under an overhead hopper disposed above the roadway of the first mine level and depositing a pre-determined quantity of the payload into the overhead hopper from a second level of the mine disposed above the first level. The loading step further includes the step of dumping the pre-determined quantity of the payload into the load-carrying body and repeating the steps of positioning, depositing and dumping as required to substantially fill the load-carrying bodies of each of the units of the multicombination vehicle.

BRIEF DESCRIPTION OF THE DRAWINGS

These and other features, aspects, and advantages of the present invention will become better understood with regard to the following description, appended claims and accompanying drawings wherein:

DETAILED DESCRIPTION

Figure 1:
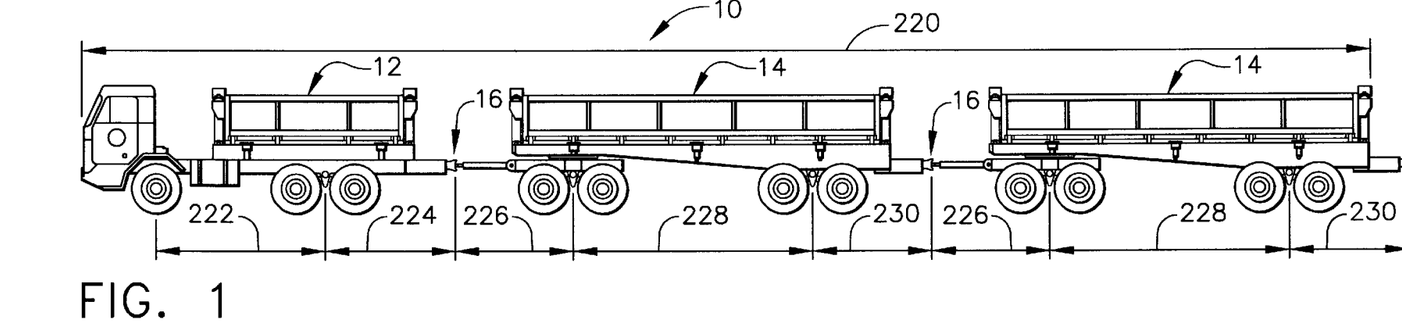
FIG. 1 is a side elevation view illustrating a multicombination vehicle according to the present invention.

Referring now to the drawings, FIG. 1 is a side elevation view illustrating a multicombination vehicle 10 according to the present invention. The unique configuration of the multicombination vehicle 10 permits the vehicle 10 to be used for transporting a payload, such as a mined ore, over the roadways existing in a typical underground mine. More particularly, as subsequently discussed in greater detail, the multicombination vehicle 10 is designed and configured to minimize the swept path width of the vehicle 10 in a turning maneuver which permits the multicombination vehicle 10 to negotiate the relatively small radius bends encountered when traveling over the roadways within a typical underground mine without requiring the tunnels to be widened. The multicombination vehicle 10 includes a powered towing unit 12, comprising a rigid body truck, and at least one towed unit 14, which may be referred to as a dog trailer. In the illustrative embodiment, vehicle 10 includes a pair of the towed units 14, with the forward towed unit 14 mechanically coupled to the rigid body truck 12 and the two towed units 14 being coupled to one another. Regardless of the number of towed units 14, each adjacent pair of units within the multicombination vehicle 10 are coupled to one another by a pin coupling, indicated generally at 16. In other embodiments, the multicombination vehicle 10 may comprise a single one of the towed units 14 or three or more of the units 14. It is considered to be within the scope of the present invention for vehicle 10 to include as many as ten of the towed units 14 while demonstrating a swept path width which is consistent with operation in a typical underground mine. Each of the towed units 14 are articulated as subsequently discussed in greater detail, and the swept path width of vehicle 10 is minimized by the novel location of the multiple articulation points, including the location of each pin coupling 16, of the multicombination vehicle 10.

Figure 2:
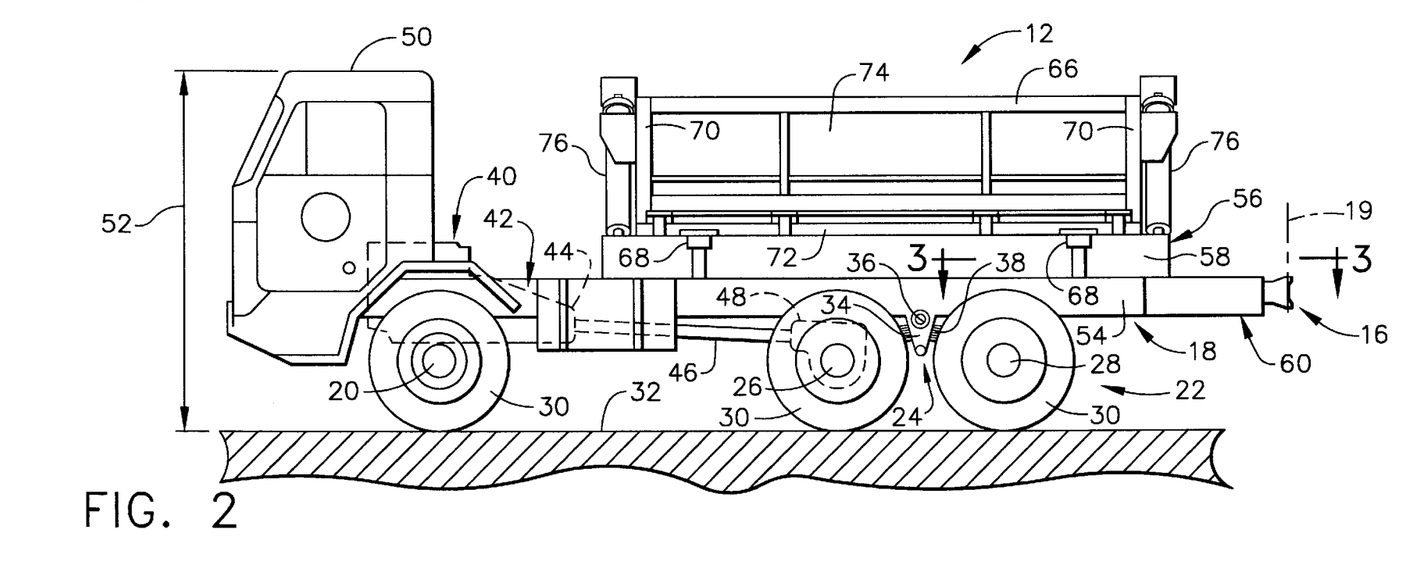
FIG. 2 is an enlarged side elevation view further illustrating the powered towing unit, or rigid body truck, shown in FIG. 1.

The rigid body truck 12 includes a chassis, or frame 18 and a forward, wheeled axle 20 which is suspended from and disposed below the chassis 18. Axle 20 comprises the steering of truck 12. The rigid body truck 12 further includes a rear tandem axle assembly, indicated generally at 22, which is suspended from chassis 18 via a rear single-point suspension system indicated generally at 24. The rear tandem axle assembly 22 includes a wheeled axle 26 and a wheeled axle 28. In the illustrative embodiment axle 26 is a driving axle and axle 28 is a driven axle. However, in one preferred embodiment both of the axles 26 and 28 are driving axles. As a further alternative, the rigid body truck may include a tridem axle assembly, having three driving axles, in lieu of the tandem axle assembly 22. A plurality of conventional rubber tires 30 are mounted on each of the axles 20, 26 and 28 and are effective for supporting the rigid body truck 12 on a surface 32 which may comprise the roadway surface of an underground mine. The single-point suspension system 24 includes a pair of brackets 34 (one shown) disposed on opposite sides of chassis 18 and extending downwardly from chassis 18. The suspension system 24 further includes a pivot comprising a transverse cylindrical member or rod 36 interconnecting the brackets 34 and a suspension spring 38 connected to the transverse rod 36 and each of the axles 26 and 28. Alternatively, in lieu of the single-point suspension system 24, the rigid body truck 12 may include other conventional suspension systems associated with the tandem axle assembly 22 such as a conventional four-spring suspension system.

The rigid body truck 12 further includes a source of motive power, indicated generally at 40, and means, indicated generally at 42, for transmitting torque from the source of motive power 40 to the drive axle 26. In the illustrative embodiment, the source of motive power 40 comprises a diesel engine and the means 42 for transmitting torque from engine 40 to drive axle 26 includes a transmission 44, a drive shaft 46 and a differential 48 connecting drive shaft 46 and axle 26. Alternatively, the source of motive power 40 may comprise other types of internal combustion engines utilizing a variety of fuels including natural gas. As yet another alternative, the source of motive power 40 may comprise an electric motor with the means 42 for transmitting torque comprising a suitable coupling interconnecting the electric motor and the drive axle 26.

The rigid body truck further includes an operator cab 50, in which the operator (not shown) sits during the operation of the multicombination vehicle 10. Cab 50 houses the control systems (not shown) associated with the rigid body truck 12 and each of the towed units 14. The cab 50 may further house at least a portion of the source of motive power 40. The cab 50 of truck 12 is specially designed to have a reduced overall height 52 from the roadway surface 32 to the top of the cab 50, as compared to conventional rigid body trucks to facilitate operation within the envelope of the tunnels within an underground mine.

The chassis 18 of truck 12 includes a pair of structural beams 54 (one shown) extending longitudinally along each side of truck 12 and a plurality of cross-members (not shown) connecting the beams 54. A sub-frame 56 is attached to an upper surface of the chassis 18 by conventional means such as a plurality of fasteners (not shown). Similar to chassis 18, the sub-frame 56 includes a pair of opposing side members 58, comprising structural beams, which extend along a portion of each side of truck 12 and are attached to the corresponding ones of the side beams 54 of chassis 18. The sub-frame 56 further includes at least one cross-member (not shown) extending transversely between and attached to the side members 58.

Figure 3:
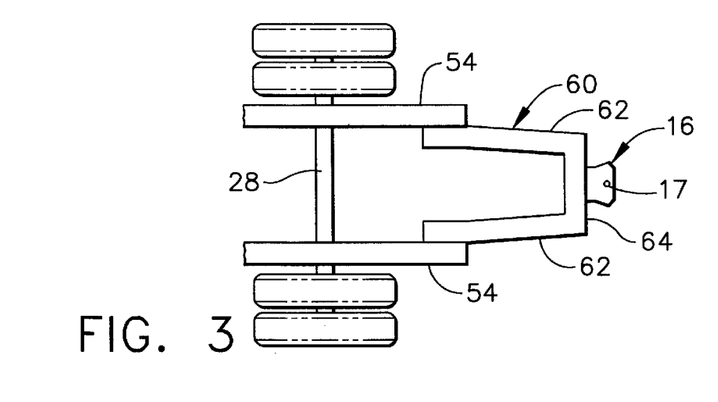
FIG. 3 is a plan view illustrating the draw frame of the powered towing unit shown in FIG. 1.

The rigid body truck 12 further includes a draw frame 60 which is attached to or may be integral with the chassis 18 and extends rearwardly from the chassis 18. Draw frame 60 carries substantially no load from sub-frame 56, bin 66 or the payload contained within bin 66. The draw frame 60 may be attached to chassis 18 by conventional fasteners (not shown) or alternatively, may be welded to chassis 18. As yet another alternative, the draw frame 60 may be integrally formed with chassis 18 as a unitary member. As shown in FIG. 3, the draw frame 60 includes a pair of side members 62 and a cross member 64 interconnecting the side members 62 and comprising a rear end of the draw frame 60. Each of the side members 62 is attached to one of the side members 54 of chassis 18. In the illustrative embodiment, the draw frame 60 has a tapered shape, when viewed in plan, tapering laterally inward in a rearward direction. However, the draw frame 60 may have a generally rectangular shape. The body of one of the pin couplings 16 is attached to the rear end 64 of the draw frame 60. The incorporation of the draw frame 60 in the multicombination vehicle 10, as well as the subsequently discussed draw frames included in each of the towed units 14, comprises an important aspect of the present invention. Draw frame 60 extends the longitudinal or axial location of the coupling 16 used to couple the rigid body truck 12 and the forward most one of the towed units 14, rearward by a significant distance as compared to conventional multicombination vehicles in which the coupling is typically attached to the rear end of the chassis. The longitudinal positioning of each of the couplings 16 of the multicombination vehicle 10 contributes to the ability of vehicle 10 to maneuver through turns with a minimum swept path width as compared to conventional vehicles having a similar overall length, as subsequently discussed in greater detail.

The rigid body truck 12 further includes a side-tipping, load-carrying body, or bin 66 which is hinged to the sub-frame 56 at one side thereof by a plurality of hinges 68. In one preferred embodiment, bin 66 has a load-carrying capacity of about 16 tons. However, the capacity of bin 66 may vary from this value. The load-carrying body 66 has an open top defined by a pair of opposing end portions 70 attached to and extending upwardly from a bottom portion 72, and a pair of opposing side portions 74 (one shown) which extend upwardly from the bottom portion 72 and interconnect the end portions 70.

The rigid body truck further includes a pair of actuators 76 which are effective for actuating the load-carrying body 66 to a tipped position, as subsequently discussed in greater detail with respect to the similar side-tipping, load-carrying bodies included on the towed units 14. Actuators 76 may comprise hydraulically or pneumatically actuated piston-type actuators. Actuators 76 have one end fixedly attached to the sub-frame 56 and an opposite, end attached to a corresponding one of the end portions 70 of the load-carrying body 66. Alternatively, the load-carrying body 66 may be raised to a tipped position by an external source such as an overhead crane (not shown).

Figure 5:
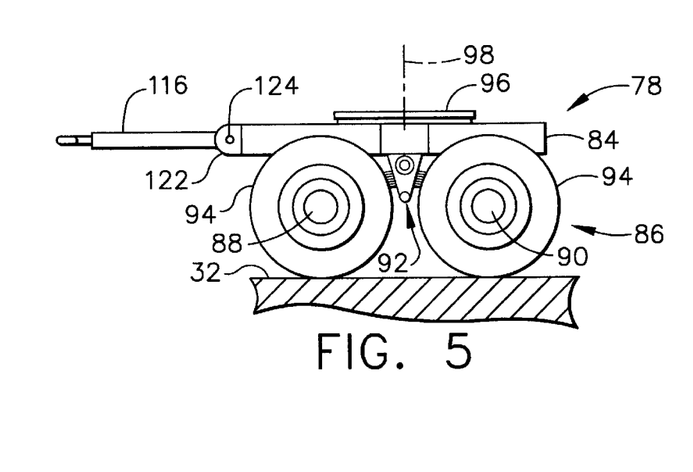
FIG. 5 is a side elevation view of the converter dolly included in each of the towed units.
Figure 6:
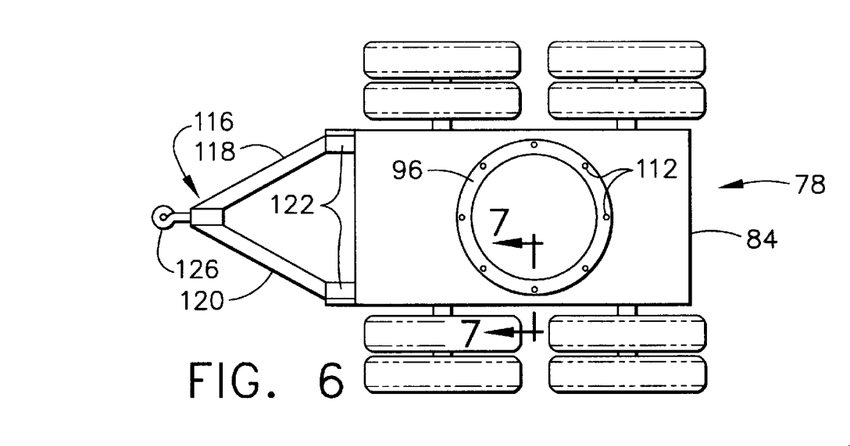
FIG. 6 is a plan view further illustrating the dolly shown in FIG. 5.
Figure 8:
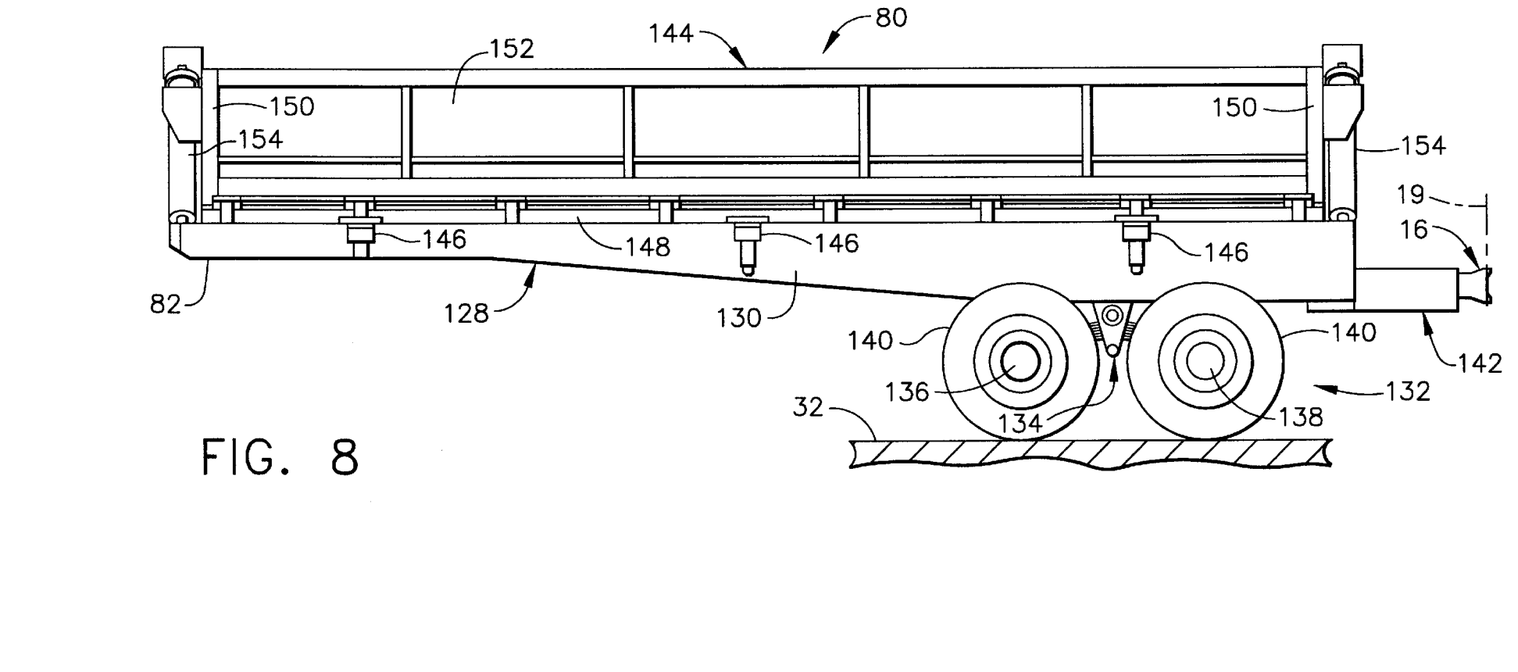
FIG. 8 is a side elevation view of a semi-trailer coupled to the dolly shown in FIGS. 5 and 6.

Each of the towed units, or dog trailers 14, comprises a converter dolly 78, shown in FIGS. 5 and 6, and a semi-trailer 80, shown in FIG. 8, having a forward end 82 mounted on the converter dolly 78. Converter dolly 78 includes a chassis 84 and a wheeled, driven tandem axle assembly 86, having a forward axle 88 and a rear axle 90, which is suspended from chassis 84 via a single-point suspension system 92. The structural features of suspension system 92 may be substantially the same as those of suspension system 24 discussed previously with respect to the rigid body truck 12. Suspension system 92 is attached to each of the axles 88 and 90. A conventional four-spring suspension system may be used in lieu of suspension system 92 to suspend axles 88 and 90 from chassis 84. Each of the axles 88 and 90 include a plurality of tires 94 mounted thereon which support the dolly 84 when traveling over the roadway surface 32.

The converter dolly 78 further includes a ball-race turntable 96 which comprises a fixed ball-race turntable in the illustrative embodiment since it is fixedly attached to both the chassis 84 of converter dolly 78 and to the semi-trailer 80. The ball-race turntable 96 permits the converter dolly 78 to pivot relative to the semi-trailer 80 about a substantially vertically extending axis of rotation 98 passing through the center of the ball-race turntable 96 and the axial or longitudinal center of the single-point suspension system 92. However, the converter dolly 78 may alternatively comprise an oscillating ball-race turntable which may further permit the dolly to pivot, or pitch about a laterally extending axis relative to the semi-trailer 80, and in certain extreme operating conditions, to roll about a longitudinally extending axis relative to the semi-trailer 80.

Figure 7:
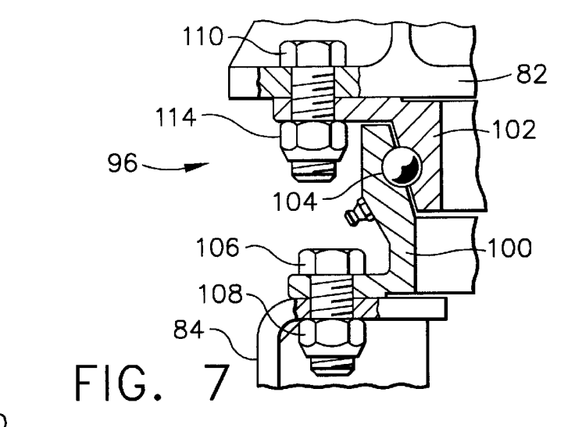
FIG. 7 is a cross-sectional view taken along line 7—7 in FIG. 6, further illustrating the ball-race turntable shown in FIG. 6.

Referring to FIG. 7, the fixed ball-race turntable 96 includes a first annular portion 100 and a second annular portion 102 and a plurality of ball bearings 104 (one shown) disposed between portions 100 and 102. The portion 100 of ball-race turntable 96 is fixedly attached to the chassis 84 of converter dolly 78 by conventional means such as a plurality of bolts 106 which pass through circumferentially spaced holes in portion 100 and aligned holes in chassis 84. Bolts 106 are secured by nuts 108. Similarly, the portion 102 of the ball-race turntable 96 is fixedly attached to the forward end 82 of the semi-trailer 80 by conventional means such as a plurality of bolts 110 which pass through a plurality of circumferentially spaced holes formed in the forward end 82 of the semi-trailer 80 as well as an aligned plurality of holes 112 formed in the portion 102 of the ball-race turntable 96, with bolts 110 being secured by nuts 114. The mounting arrangement of the fixed ball-race turntable 96 shown in FIG. 7, and just described, permits the converter dolly 78 of the towed unit 14 to pivot about the axis 98 relative to the semi-trailer 80. The axial, or longitudinal location of this axis of rotation through the center of the ball-race turntable 96 and the center of the single-point suspension system 92, for each towed unit 14, also comprises an important feature of the present invention.

The converter dolly 78 further includes a drawbar 116 which is hingedly connected to the chassis 84 of the converter dolly 78 which permits vehicle 10 to accommodate changes in grade of the roadway surface 32. In the illustrative embodiment, the drawbar 116 comprises an A-frame tow bar having tapered members 118 and 120 which are attached to one another at one end. The opposite end of each of the members 118 and 120 is hinged to one of a pair of brackets 122 attached to the chassis 84 of converter dolly 78, via pins 124 (one shown). The A-frame tow bar 116 further includes a drawbar eye 126 which engages the pin coupling 16 of the upstream or forward vehicle to which the particular towed unit 14 is mechanically coupled. It should be understood that the drawbar 116 may have other shapes, i.e. different from the A-frame shape shown, provided that drawbar 116 terminates in a drawbar eye 126 at a forward end thereof. For instance, with respect to the first towed unit 14, which is mechanically coupled to the rigid body truck 12, the drawbar eye 126 of this towed unit 14 engages the coupling 16 which is attached to the draw frame 60 of the rigid body truck 12. Each of the pin couplings 16 is a conventional quick-release pin coupling, such as the Ringfeder Automatic Coupling made by RINGFEDER, and includes an internal cavity with a pin 17 disposed therein. As the drawbar eye 126 is inserted longitudinally within the cavity of the coupling 16, the pin 17 of the coupling 16 engages the drawbar eye 126, coupling the corresponding adjacent pair of units of vehicle 10. The converter dolly 78 may pivot relative to truck 12 (or a forward and adjacent one of the towed unit 14) about a substantially vertical axis of rotation 19 passing through the cross-sectional center of pin 17 of coupling 16 and through the drawbar eye 126.

Figure 4:
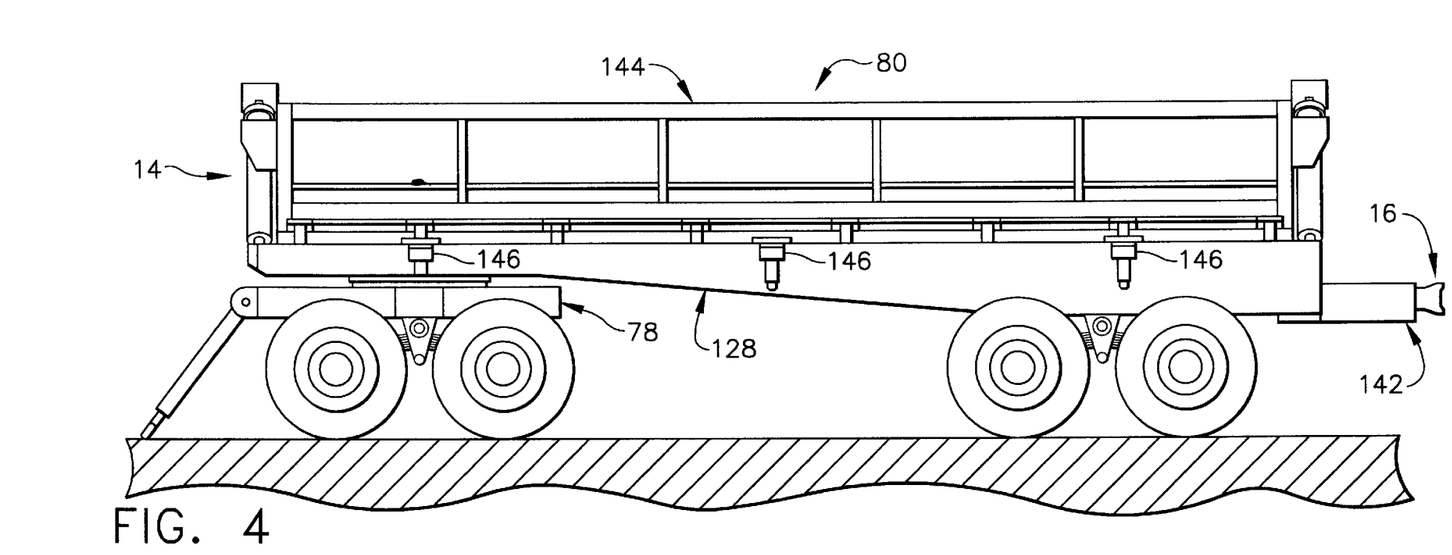
FIG. 4 is an enlarged side elevation view of one of the towed units shown in FIG. 1.

Referring now to FIGS. 4 and 8, the semi-trailer 80 includes a chassis 128, including the forward end 82 of semi-trailer 80 which is attached to the ball-race turntable 96 of the converter dolly 78. The chassis 128 may comprise a pair of longitudinally extending side members 130 and a plurality of transversely extending cross members interconnecting and attached to the side members 128. The semi-trailer 80 further includes a rear, tandem axle assembly 132 which is suspended from the chassis 128 via a single-point suspension system indicated generally at 134 in the illustrative embodiment. The components of the single-point suspension system 134 may be the same as those described previously with respect to the suspension system 24 of the rigid body truck 12. Alternatively, the semi-trailer 80 may include a conventional four-spring suspension system in lieu of the single-point suspension system 134. The tandem axle assembly 132 includes a forward, wheeled axle 136 and a rear, wheeled axle 138, with both of the axles 136 and 138 being connected to the suspension system 134 and comprising driven axles. The axles 136 and 138 each include a plurality of tires 140 mounted thereon for supporting the semi-trailer 80 as the multicombination vehicle 10 travels over the roadway surface 32.

The semi-trailer 80 further includes a draw frame 142 which is attached to or may be integral with the chassis 128 of the semi-trailer 80 as described previously with respect to draw frame 60 and chassis 18 of truck 12. Draw frame 142 extends rearwardly from chassis 128. The draw frame 142 may be fixedly attached to chassis 128 by conventional means such as a plurality of fasteners (not shown) or welding, for instance. Alternatively, the draw frame 142 may be integrally formed with chassis 128. The semi-trailer 80 further includes one of the pin couplings 16 which is attached to a rear end of the draw frame 142. The incorporation of draw frame 142 positions coupling 16 rearward relative to the chassis 128 and the single-point suspension system 134. The longitudinal, or axial spacing between coupling 16 and the longitudinal center of the single-point suspension system 134 comprises an important feature of the present invention and contributes to the novel operating characteristics of the multicombination vehicle 10 as subsequently discussed in greater detail.

Semi-trailer 80 further includes a load-carrying body, or bin 144 which is hingedly attached to chassis 128, at one side thereof, by a plurality of longitudinally spaced hinges 146. The bin 144 includes a bottom portion 148, a pair of opposing end portions 150 attached to and extending upwardly from the bottom portion 148, and a pair of opposing side portions 152 attached to and extending upwardly from the bottom portion 148 and interconnecting the opposing end portions 150. The end portions 150 and side portions 152 define an open top of the load-carrying bin 144 so that bin 144 may be loaded with a payload such as a mined ore. In one preferred embodiment, the payload capacity of bin 144 is about 32 tons. However, the capacity of bin 144 may vary from this value.

Figure 9:
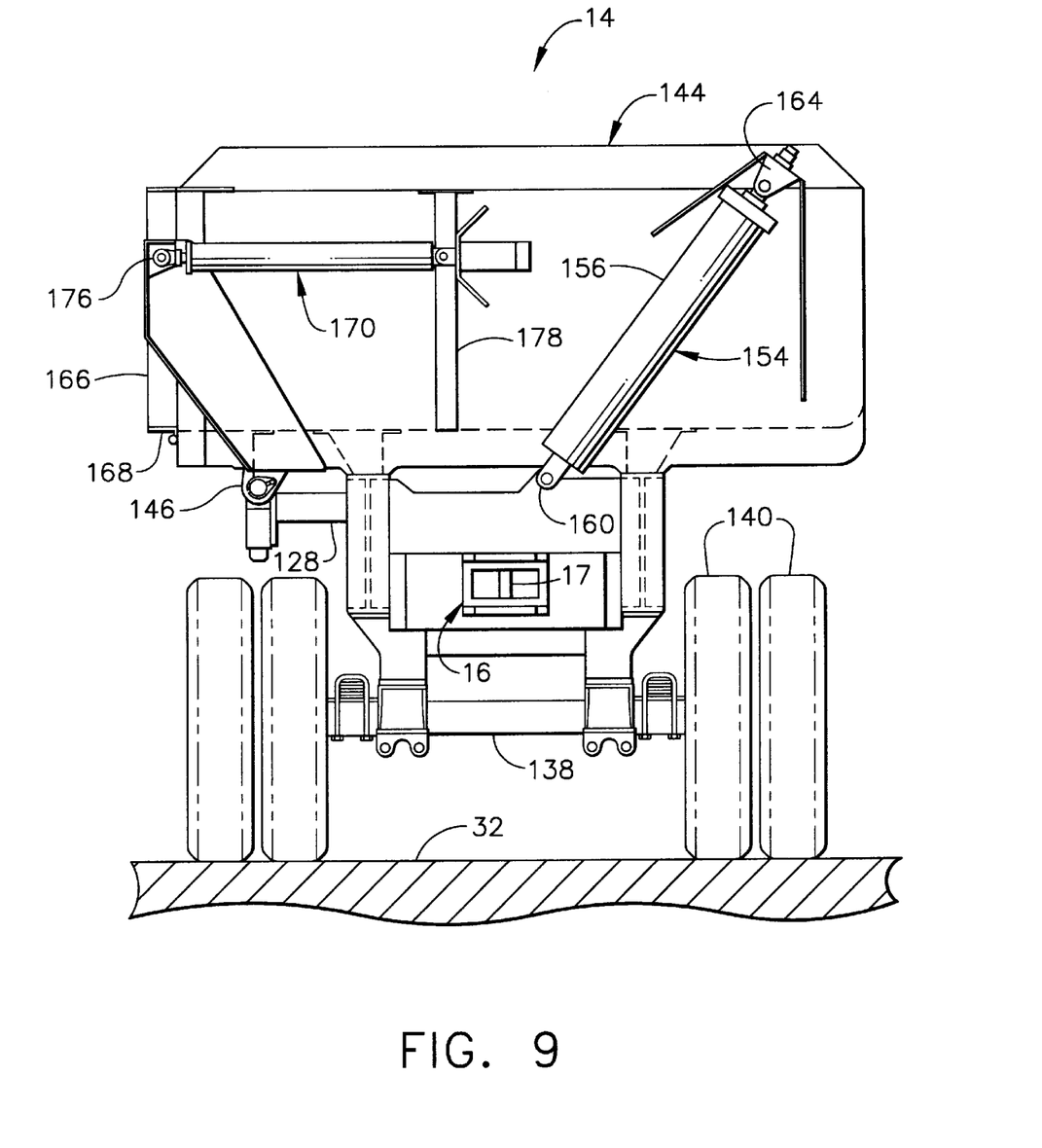
FIG. 9 is an end view of one of the towed units with the included load-carrying body shown in a stowed or transporting position.
Figure 10:
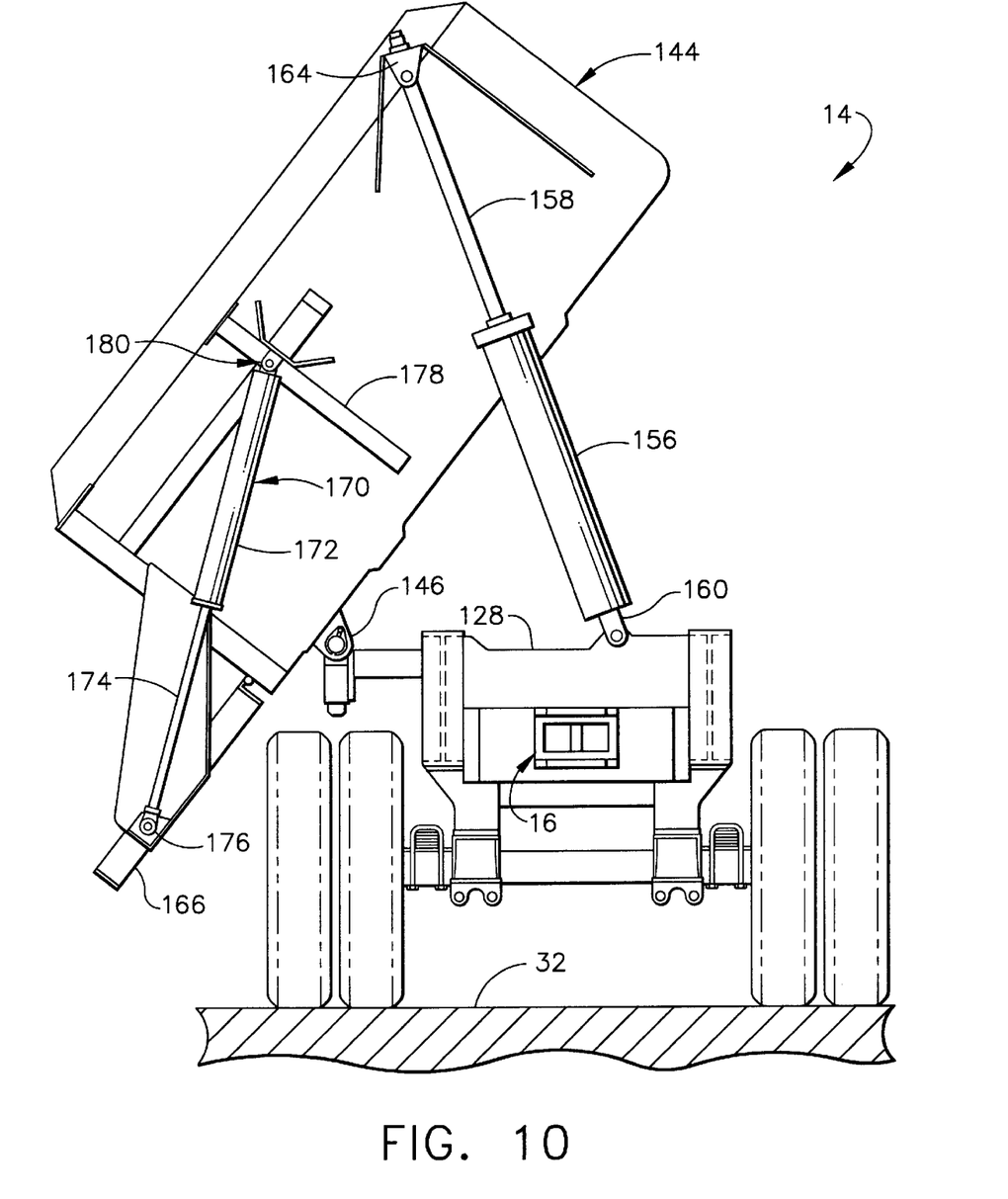
FIG. 10 is an end view similar to FIG. 9 with the load-carrying body shown in a tipped position.

The semi-trailer 80 of the towed unit 14 preferably includes a pair of actuators 154 which are interconnected between and attached to the chassis 128 and an upper portion of the load-carrying bin 144. Actuators 150 are effective for actuating bin 144 as illustrated in FIGS. 9 and 10 which depict bin 144 in a transporting and a tipped position respectively. In the illustrative embodiment, the actuators 154 are hydraulically actuated but may alternatively be actuated by pneumatic pressure. Actuators 154 include a hollow, generally cylindrical portion 156 and a piston 158 which slidingly engages the cylindrical portion 156. Each actuator 154 further includes a bracket 160 which is attached to the chassis 128 of the semi-trailer 80 by conventional means such as fasteners. A distal end of piston 158 is attached to a bracket 164, which in turn is attached to an upper portion of the rear one of the end portions 150 of bin 144 at a location proximate one of the side portions 152 of bin 144. Bin 144 is hinged to chassis 128, via hinges 146, at a location proximate the opposite one of the side portions 152 as shown in FIGS. 9 and 10. The side portion 152 adjacent to hinges 146 includes a door 166 which is hinged, via a plurality of hinges 168, to the side portion 152 disposed proximate hinges 146. The semi-trailer 80 further includes a pair of actuators 170 (one shown) which are interconnected between one of the end portions 150 of bin 144 and door 166 as shown in FIGS. 9 and 10. Actuators 170 are preferably hydraulically actuated but may also be pneumatically actuated. Actuators 170 include a hollow cylindrical portion 172 and a piston 174 which slidingly engages the cylindrical portion 172. A distal end 176 of piston 174 is attached to the door 166 and a proximal end of cylinder 172 is attached to a rib 178 of one of the end portions 150 of bin 144 via a bracket assembly indicated generally at 180 and conventional fasteners.

When the operator of the multicombination vehicle 10 wishes to dump the payload in bin 144 of any of the towed units 14, the operator actuates appropriate controls within the cab 50 which causes hydraulic or pneumatic fluids to enter the cylindrical portions 156 of actuators 154 and the cylindrical portions 172 of actuators 170 via conduits (not shown) extending from the cab 50 to the corresponding actuators. The hydraulic or pneumatic pressure causes pistons 158 and 174 to extend, which may preferably occur simultaneously, so as to raise the bin 144 to a side-tipped position as shown in FIG. 10 and to open the door 166 permitting the payload within bin 144 to be dumped therefrom. As shown in FIG. 10, door 166 permits the payload to be dumped at an orientation away from the tires 140 of the semi-trailer 80. The operation just described also applies to the dumping of payload from bin 66 of the rigid body truck 12. It is noted that bin 66 also includes a side door similar to door 166 of bin 144. As noted previously with respect to bin 66, bin 144 may alternatively be lifted to a tipped, dumping position by an external source such as an overhead crane.

Figure 11:
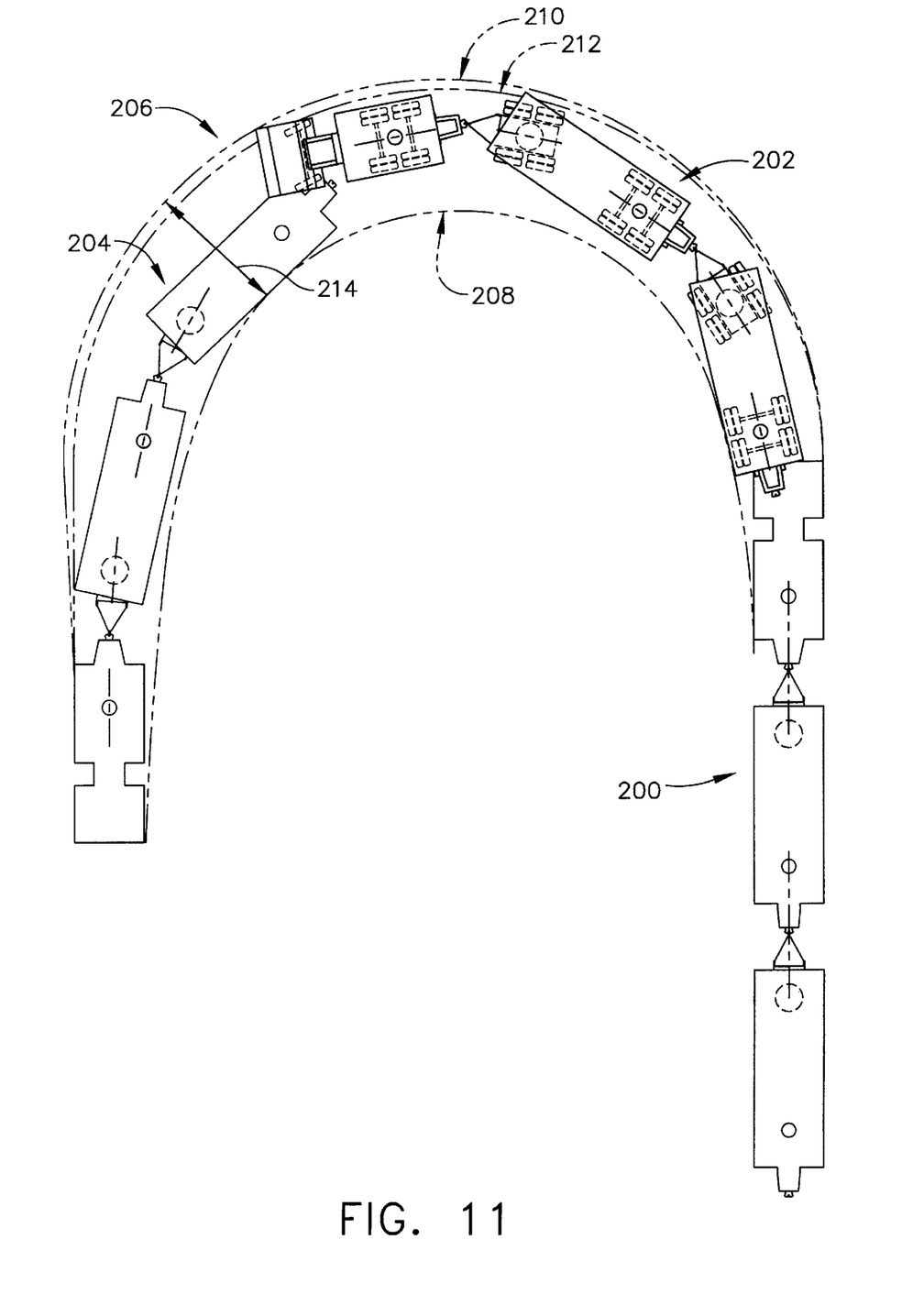
FIG. 11 is a schematic illustrating the swept path and swept path width of a multicombination vehicle embodying the principles of the present invention.

The unique configuration of the multicombination vehicle 10 minimizes the swept path width of vehicle 10 as vehicle 10 engages in a turning maneuver, as may best be understood with reference to FIGS. 1 and 11, and the following examples. FIG. 11 illustrates the multicombination vehicle 10 in three positions as it negotiates a 180° turn. In the first position, indicated generally at 200, the multicombination vehicle 10 is just entering the turn. In the second position, indicated generally at 202, the multicombination vehicle 10 has negotiated a portion of the turn, and in the third position indicated generally at 204, vehicle 10 is exiting the 180° turn. The various positions of the multicombination vehicle 10, as it traverses the 180° turn, describes a swept path 206 having an inner portion indicated in phantom by curved line 208 and an outer portion indicated in phantom by curved line 210. It is noted that line 210 corresponds to the path described by a forward corner of the rigid body truck 12. The path described by the forward steering axle 20 of truck 12 describes a curved path 212 which is disposed inward of path 210. The special configuration of the multicombination vehicle 10, as subsequently discussed, minimizes a swept path width 214 which is defined as the maximum transverse distance extending between path 210 and path 208 as shown in FIG. 11, as measured in a direction substantially perpendicular to a tangent to path 210. It should be understood that the configuration of vehicle 10 also minimizes the swept path of vehicle 10 as vehicle 10 negotiates turns other than 180° turns.

As shown in FIG. 1, the multicombination vehicle 10 includes an overall length 220 extending from the forward most portion of truck 12 to the rearmost portion of the last one of the towed units 14. The rigid body truck 12 includes a wheel base 222 which is defined as the longitudinal distance between the center of the forward axle 20 and the longitudinal center of the suspension system 24. Truck 12 further includes a coupling overhang 224 which is defined as the longitudinal distance between the center of the suspension system 24 and the substantially vertical axis of rotation 19 passing through the coupling 16 attached to draw frame 60. Each of the towed units 14 includes a dolly drawbar length 226 defined as the longitudinal distance between the substantially vertical axis of rotation 19 passing through the drawbar eye 126 and the longitudinal center of the suspension system 92. Length 226 is not the longitudinal length of drawbar 116. The towed units 14 further include a trailer dimension, or wheel base 228, defined as the longitudinal distance between the longitudinal center of suspension system 92 of dolly 78 and the longitudinal center of the suspension system 134 of the semi-trailer 80. Additionally, each towed unit further includes a coupling overhang defined as the longitudinal distance between the longitudinal center of the suspension system 134 of the semi-trailer 80 and the substantially vertical axis of rotation 19 passing through the coupling 16 attached to the draw frame 142 of semi-trailer 80.

As the multicombination vehicle 10 enters a turn, the operator of the vehicle turns the steering mechanism (not shown) as required to turn the steering axle 20 of the rigid body truck 12. This causes the outer tire 30 of the steering axle 20 to follow the curved path 212 and a forward, outer (with respect to the center of the turn) portion of the truck to describe the curved path 210 shown in FIG. 11 for a 180° turn. The manner in which the towed units 14 follow the rigid body truck 12 and one another is governed by the value of the longitudinal distances 222 and 224 of the rigid body truck 12 and the longitudinal distances 226 and 228 of each of the towed units 14, as well as the longitudinal distance 230 of each of the towed units 14 except for the last one of the towed units 14. The presence of the draw frame 60 of the rigid body truck 12 as well as the draw frames 142 of each of the towed units 14 permits the swept path width of the multicombination vehicle 10 to be minimized and significantly reduced relative to known multicombination vehicles used for aboveground use, as subsequently discussed. The inventor has utilized a computerized swept path width analysis program to determine the required values of distances 222, 224, 226, 228 and 230 to minimize the swept path width 214 of the multicombination vehicle 10. Based on this analysis, the inventor has determined that the swept path width 214 will be minimized, and acceptable for use in an underground mine, if the following criteria are met:

the dolly drawbar length 226 of each of the towed units 14 is less than about 2.5 to about 2.75 meters;

the ratio of the coupling overhang 224 of the rigid body truck to the wheelbase 222 of the rigid body truck is greater than about 0.5 to about 0.52;

the ratio of the coupling overhang 230 of the towed unit 14 to the wheelbase 228 of the towed unit 14 is greater than about 0.5 to about 0.52 for each of the towed units 14 included in vehicle 10.

The foregoing dolly drawbar lengths and ratios for vehicle 10 are different than generally equivalent dimensions and ratios for known multicombination vehicles or road trains which are used for aboveground use. The above ground road trains have a drawbar length greater than 3.0 meters which is a typical requirement to be road-legal. Furthermore, the coupling location-to-wheelbase ratio of above ground road trains typically is in the range of about 0.32 to about 0.44. It should be understood that the known vehicles for aboveground use do not include the draw frame 60 of rigid body truck 12 and the draw frames 142 of the towed units 14, and accordingly do not include the longitudinal locations of the couplings 16 of the multicombination vehicle 10 of the present invention.

Comparative Example

The inventor has conducted additional swept path width, computer-aided analysis which demonstrates the reduction in swept path width which may be achieved by the multicombination vehicle 10 of the present invention as compared to known vehicles having a similar configuration with the exception that the known vehicles do not include the draw frames 60 and 142 as described previously. For purposes of this example, the various values of the multicombination vehicle 10 discussed above had the following values:

wheelbase 222 of truck 12=4.27 m (168");

coupling overhang 224 of truck 12=2.46 m (97");

dolly drawbar length 226 of each towed unit 14=2.46 m (97");

wheelbase 228 of each towed unit 14=4.97 m (196");

coupling overhang 230 of each towed unit 14=2.46 m (97");

overall length of vehicle 10=27 m (1062")

The comparison vehicle had the same overall length. The comparison vehicle did not include draw frame 60 of truck 12 or draw frames 142 of towed units 14 and had a dolly drawbar length of 3.1 m which is greater than the minimum legal requirement of 3.0 m (for use on an above ground road), and were otherwise configured substantially the same as vehicle 10. The swept path width for vehicle 10 as well as the comparative vehicle were evaluated for a 15 m, 180° turn, similar to the turn shown in FIG. 11, with the swept path width of vehicle 10 and the comparative vehicle shown in Table 1 below. In Table 1 it is noted that R+2 signifies a vehicle having a rigid body truck plus two towed units, R+3 signifies rigid body truck plus three towed units, etc.

| Configuration | Vehicle 10 m(in) | Comparison Vehicle m(in) | % Difference in Swept Path Width |
| --- | --- | --- | --- |
| R + 2 | 5.31 (209) | 5.92 (233) | 10.3 |
| R + 3 | 6.4 (252) | 7.44 (293) | 14.0 |
| R + 4 | 7.87 (310) | 9.02 (355) | 12.7 |

The results shown in Table 1 demonstrate that the novel features and configuration of the multicombination vehicle 10 of the present invention result in a swept path width which is significantly reduced relative to aboveground road trains having a comparable configuration, i.e., R+2, etc. This reduction in swept path width permits the multicombination vehicle 10 of the present invention to gain access to an underground mine and operate within the tunnels typically found in underground mines such as those associated with the mining of metal ores such as zinc.

In operation, the multicombination vehicle 10 may be advantageously utilized to transport a payload, such as a mined metal ore or other product, through the tunnels existing in an underground mine. Vehicle 10 is not route specific, unlike known railway systems, and therefore can transport ore between a variety of mining areas to central dumping areas. Furthermore, vehicle 10 may be used to transport relatively large payloads in an economical fashion as compared to the use of single rigid body dump trucks, for instance. For instance, in one embodiment where the multicombination vehicle 10 includes rigid body truck 12 and a pair of the towed units 14, the combined payload capacity of vehicle 10 is about eighty metric tonnes. In addition to the minimized swept path width 214 of vehicle 10, the reduced height 52 of cab 50 of rigid body truck 12, as well as the use of the side-tipping load carrying bodies for truck 12 and each of the towed units 14 further accommodates the use of vehicle 10 within the existing tunnels of underground mines.

Figure 12:
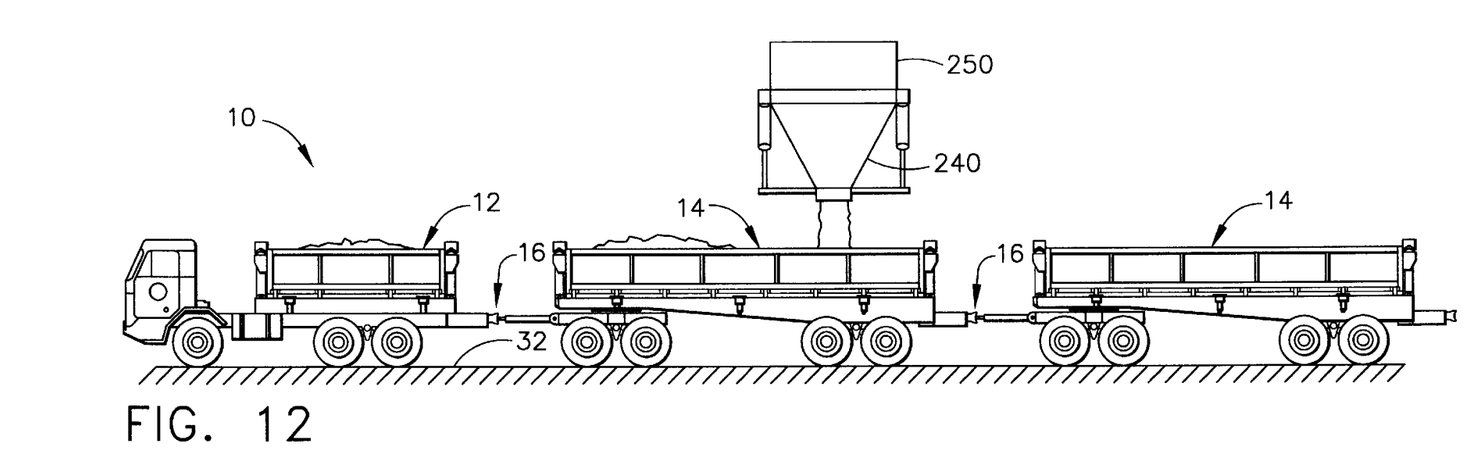
FIG. 12 is a side elevation view illustrating the payload loading step of the method of the present invention.
Figure 13:
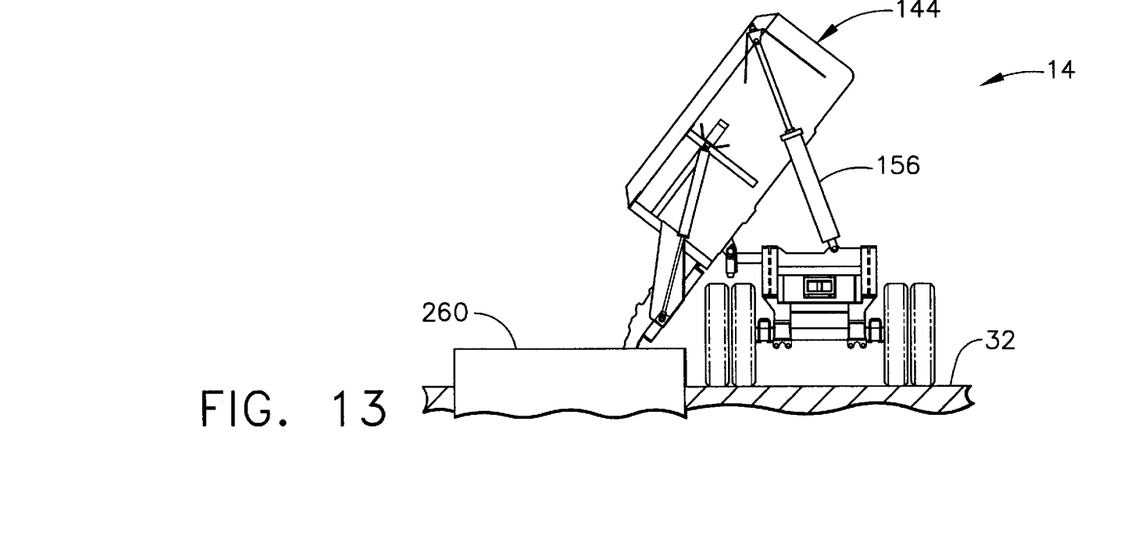
FIG. 13 is an end view illustrating the payload dumping step of the method of the present invention.

The included method steps of the present invention may be further understood with reference to FIGS. 12 and 13 and the following discussion. A typical underground mine, such as that used to mine zinc ore, may include multiple levels which are vertically spaced from one another. The multicombination vehicle may be driven over the roadway 32 of a first level of the mine to a payload receiving area disposed on the first level. The vehicle 10 is then positioned under an overhead hopper 240 disposed above the roadway 32 of the first level of the mine. A pre-determined quantity of the payload ore is deposited into the overhead hopper 240 from a second level of the mine via a vertically extending chute 250 which interconnects the first and second levels of the mine. When vehicle 10 is properly positioned, the operator of vehicle 10 releases the pre-determined quantity of ore from hopper 240 into the load-carrying body or bin of either truck 12 or one of the towed units 14. In one preferred embodiment, this pre-determined quantity of ore is about sixteen tons, with truck 12 being capable of receiving and carrying one such load, and each of the towed units 14 being capable of receiving and carrying two such loads, or about thirty two tons of payload. The vehicle 10 is repositioned so that the load-carrying bodies of truck 12 and each of the towed units 14 are substantially filled with the payload.

The vehicle 10 is then driven over the roadway surface 32 of the first level of the mine to a payload-dumping area shown in FIG. 13. Vehicle 10 is then positioned so that either the load-carrying body of truck 12 or the load-carrying body of one of the towed units 14 is positioned adjacent to a receptacle 260 disposed in the payload-dumping area. The load-carrying body, such as bin 144 of one of the towed units 14 is then tipped as shown in FIG. 13, with the payload being dumped into receptacle 260. Receptacle 260 may interconnect with a third level of the mine which is disposed below the first level, i.e. the one including roadway 32, and may communicate with a central ore processor disposed on the lower level. The ore may then be crushed to a suitable size and extracted from the mine through a vertically extending chute or shaft extending to the ground surface above. It should be understood that variations of the foregoing method steps are considered to be within the scope of the present invention. For instance, vehicle 10 may receive payload in a manner other than that described above in connection with the overhead hopper 240, and may dump the payload in a receptacle which does not communicate with a lower level of the mine.

The use of the multicombination vehicle 10 of the present invention for transporting a payload, such as a metal ore, over the roadways existing in underground mines provides significant commercial advantages as compared to the use of known systems for transporting such payloads within underground mines. As discussed previously, the multicombination vehicle is not route-specific and therefore is much more flexible than an underground railway system. Furthermore, the inventor has determined that the use of the multicombination vehicle 10 in lieu of rigid body trucks, with no towed units, may save a mine operator $2.0 or more per metric tonne of hauled payload. This is due to a variety of factors including the fact that the cost efficiency of the multicombination vehicle 10 increases as hauled payload distance increases, unlike known conventional rigid body dump trucks typically used in underground mines. Furthermore, the multicombination vehicle 10 of the present invention has a significantly higher payload-to-tare weight ratio and a significantly higher payload-to-horsepower ratio than conventional dump trucks typically used in underground mines. For instance, the payload-to-tare ratio for vehicle 10 is about 1.86:1 for the embodiment corresponding to rigid body truck 12 and a pair of the towed units 14, while the payload-to-tare ratio for typical known underground dump trucks ranges from about 1.16:1 to about 1.28:1. Furthermore, the payload-to-horsepower ratio of the same embodiment of vehicle 10 is about 0.18:1, while the payload-to-horsepower ratio of typical, known underground dump trucks is about 0.07:1 to about 0.08:1. The foregoing advantages of the multicombination vehicle 10 of the present invention as compared to known underground dump trucks may result in a significant commercial savings for the operator of the underground mine.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. A multicombination vehicle for use in transporting a mined product over roadways in an underground mine, said vehicle comprising:

a powered towing unit including a chassis having, at least one longitudinally extending member, said powered towing unit further including a forward, wheeled steering axle suspended from said chassis and a rear axle assembly having at least one wheeled axle and suspended from said chassis by a rear suspension system, said wheeled axles supporting the powered unit for movement over the roadways, wherein at least one of said wheeled axles comprises a driving axle, said powered towing unit further including a source of motive power mounted on said chassis and means for transmitting torque from said source of motive power to said at least one driving axle; and a towed unit mechanically coupled to said powered towing unit and including a chassis, a load-carrying body mounted on and disposed above said chassis, and at least one wheeled, driven axle supporting the towed unit for movement over the roadways, said at least one wheeled, driven axle being suspended from said chassis of said towed unit, said towed unit further including a drawbar attached to and extending forward from said chassis of said towed unit;

said powered towing unit further comprising:

a draw frame attached to and extending rearwardly from said chassis of said towing unit, said draw frame including a forward end and a rear end, said forward end of said draw frame being attached to said chassis of said towing unit, said rear end of said draw frame being longitudinally spaced rearwardly from a rear end of said at least one longitudinally extending member;

a coupling attached to said rear end of said draw frame, said coupling being connected with said drawbar of said towed unit;

a coupling overhang defined as the longitudinal distance between a substantially vertical axis of rotation passing through said coupling and a longitudinal center of said rear suspension system;

a wheelbase defined as the longitudinal distance between a longitudinal center of suspension of said forward, wheeled axle and said longitudinal center of suspension of said rear suspension system;

wherein a ratio of said coupling overhang to said wheelbase has a value of at least 0.5 and is effective for reducing a swept path width of the multicombination vehicle as the vehicle engages in a turning maneuver on the roadways of the underground mine relative to a swept path width of an otherwise similar multicombination vehicle lacking said draw frame and having a smaller coupling, overhang-to-wheelbase ratio.

2. The multicombination vehicle as recited in claim 1, wherein:

said powered towing unit further includes a load-carrying body mounted on and disposed above said chassis.

3. The multicombination vehicle as recited in claim 2, wherein:

said load-carrying body is a side-tipping, load-carrying body having a bottom portion, a pair of opposing end portions attached to and extending upwardly from said bottom portion, a pair of opposing side portions attached to and extending upwardly from said bottom portion and interconnecting said end portions, said side portions and said end portions defining an open top;

said bottom portion being hinged to said chassis of said towing unit at a location proximate one of said side portions;

said powered towing unit further including a pair of actuators, each of said actuators being disposed proximate one of said end portions and attached at one end to said chassis and at the opposite end to the corresponding one of said end portions, said actuators being operable for actuating said side-tipping, load-carrying body to a tipped position.

4. The multicombination vehicle as recited in claim 3, wherein:

one of said side portions is hinged to said bottom portion, said one of said side portions being actuatable to an open position when said side-tipping, load-carrying body is in said tipped position.

5. The multicombination vehicle as recited in claim 1, wherein:

said powered towing unit is a rigid body truck;

said source of motive power is an internal combustion engine; and said means for transferring torque comprises a transmission.

6. The multicombination vehicle as recited in claim 5, wherein:

said rear, wheeled axle assembly comprises a tandem axle assembly having a pair of wheeled axles with at least one of said pair comprising a driving axle.

7. The multicombination vehicle as recited in claim 1, wherein:

said drawbar is hinged at a rear end thereof to a forward end of said towed unit.

8. The multicombination vehicle as recited in claim 7, wherein:

said drawbar comprises an A-frame drawbar.

9. The multicombination vehicle as recited in claim 1, further comprising:

a plurality of said towed units; wherein a forward most one of said plurality of said towed units is mechanically coupled to said powered towing unit and each adjacent pair of said towed units are mechanically coupled to one another.

10. The multicombination vehicle as recited in claim 9, wherein:

said load-carrying body of each of said towed units is a side-tipping, load-carrying body.

11. The multicombination vehicle as recited in claim 9, wherein each of said towed units further comprises:

a draw frame attached to and extending rearwardly from said chassis;

a coupling attached to a rear end of said draw frame;

wherein, for any adjacent pair of said plurality of towed units, said coupling of a forward one of said pairs is mechanically coupled to said drawbar of a rear one of said pair.

12. The multicombination vehicle as recited in claim 11, wherein each of said towed units further comprises:

a converter dolly and a semi-trailer having a forward end mounted on said converter dolly.

13. The multicombination vehicle as recited in claim 12, wherein:

each of said converter dollies includes a chassis, a ball-race turntable mounted on an upper surface of said chassis and a wheeled, tandem axle assembly suspended from a lower surface of said chassis, said converter dolly further including said drawbar of said towed unit.

14. The multicombination vehicle as recited in claim 13, wherein:

said semi-trailer includes a chassis and a wheeled, tandem axle assembly suspended below a rear portion of said chassis, said semi-trailer further comprising said load-carrying body of said towed unit;

said chassis of said towed unit comprises said chassis of said converter dolly and said chassis of said semi-trailer.

15. The multicombination vehicle as recited in claim 11, wherein each said towed units further comprises;

a forward, tandem axle assembly suspended from said chassis by a first suspension system;

a rear tandem axle assembly suspended from said chassis by a second suspension system;

a wheelbase defined as the longitudinal distances between a longitudinal center of said first suspension system and a longitudinal center of said second suspension system;

a coupling overhang defined as the longitudinal distance between said longitudinal center of said second suspension system and a substantially vertical axis of rotation passing through said coupling attached to said draw frame of said towed unit;

wherein a ratio of said coupling overhang to said wheelbase of said towed unit is at least 0.5 for each of said towed units.

16. The multicombination vehicle as recited in claim 15, wherein:

said dolly drawbar length is less than 3.0 meters for each of said towed units.

17. A multicombination vehicle for use in transporting a mined product over roadways in an underground mine, said vehicle comprising:

a powered towing unit including a chassis having at least one longitudinally extending member, said powered towing unit further including a forward, wheeled steering axle suspended from said chassis and a rear axle assembly having at least one wheeled axle and suspended from said chassis by a rear suspension system, said wheeled axles supporting the powered unit for movement over the roadways, wherein at least one of said wheeled axles comprises a driving axle, said powered towing unit further including a source of motive power mounted on said chassis and means for transmitting torque from said source of motive power to said at least one driving axle; and a towed unit mechanically coupled to said powered towing unit and including a chassis, a load-carrying body mounted on and disposed above said chassis, and a plurality of wheeled, driven axles supporting the towed unit for movement over the roadways, said plurality of wheeled, driven axles being suspended from said chassis of said towed unit, said towed unit further including a drawbar attached to and extending forward from said chassis of said towed unit;

said powered towing unit further comprising:
 a draw frame attached to and extending rearwardly from said chassis of said towing unit, said draw frame including a forward end and a rear end, said forward end of said draw frame being attached to said chassis of said towing unit, said rear end of said draw frame being longitudinally spaced rearwardly from a rear end of said at least one longitudinally extending member;
 a coupling attached to a rear end of said draw frame, said coupling being connected with said drawbar of said towed unit;
 a coupling overhang defined as the longitudinal distance between a substantially vertical axis of rotation passing through said coupling and a longitudinal center of said rear suspension system;
 a wheelbase defined as the longitudinal distance between a longitudinal center of suspension of said forward, wheeled axle and said longitudinal center of suspension of said rear suspension system;

wherein a ratio of said coupling overhang to said wheelbase has a value of at least 0.5; wherein:
 said towed unit further comprises a converter dolly and a semi-trailer having a forward end mounted on said converter dolly;
 said converter dolly includes a chassis, a ball-race turntable mounted on an upper surface of said chassis and a wheeled, tandem axle assembly suspended from a lower surface of said chassis, said tandem axle assembly including a pair of said wheeled, driven axles, said converter dolly further including said drawbar of said towed unit;
 said towed unit further comprising a dolly drawbar length defined as the longitudinal distance between said substantially vertical axis of rotation passing through said coupling and a longitudinal center of suspension of said tandem axle assembly of said dolly;
 said dolly drawbar length has a value less than 3.0 meters, said ratio of said coupling overhand to said wheelbase of said powered towing unit combining with said dolly drawbar length to minimize a swept path width of the multicombination vehicle as the vehicle engages in a turning maneuver on the roadways of the underground mine.

18. The multicombination vehicle as recited in claim 17, wherein:
 said semi-trailer includes a chassis and a wheeled, tandem axle assembly suspended below a rear portion of said chassis by a suspension system, said semi-trailer further including said load-carrying body of said towed unit;
 said chassis of said towed unit comprises said chassis of said converter dolly and said chassis of said semi-trailer.

* * * * *

UNITED STATES PATENT AND TRADEMARK OFFICE
CERTIFICATE OF CORRECTION

PATENT NO. : 6,062,801
DATED : May 16, 2000
INVENTOR(S) : James W. Cooper

It is certified that error appears in the above-identified patent and that said Letters Patent is hereby corrected as shown below:

Column 5,
Line 44, after "steering", -- axle -- is inserted.

Column 8,
Line 51, after "towed", "unit" is deleted and in place thereof -- units -- is inserted.

Column 14,
Line 28, after "having", "," is deleted.

Column 15,
Line 10, after "coupling", "," is deleted.

Column 16,
Line 38, after "each", -- of -- is inserted.
Line 43, after "longitudinal", "distances" is deleted and in place thereof -- distance -- is inserted.

Column 18,
Line 19, after "coupling", "overhand" is deleted and in place thereof -- overhang -- is inserted.

Signed and Sealed this

Eleventh Day of June, 2002

*Attest:*

JAMES E. ROGAN
*Attesting Officer*   Director of the United States Patent and Trademark Office